Figure 1:
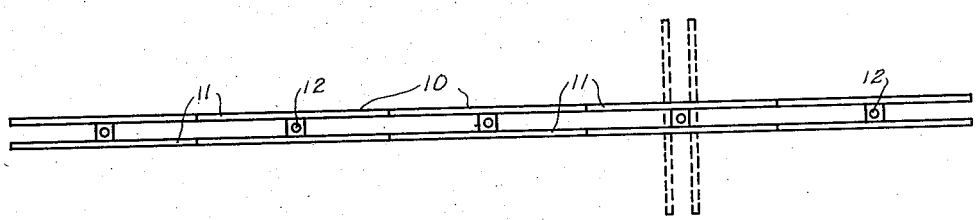

June 13, 1950            E. L. CODY            2,511,316

AUTOMOBILE SERVICING SYSTEM AND MEANS

Filed Feb. 10, 1947            4 Sheets-Sheet 1

INVENTOR:
EDWARD L. CODY
BY
ATTORNEY

June 13, 1950 E. L. CODY 2,511,316
AUTOMOBILE SERVICING SYSTEM AND MEANS
Filed Feb. 10, 1947 4 Sheets-Sheet 2

INVENTOR:
EDWARD L. CODY
BY
ATTORNEY

INVENTOR.
EDWARD L. CODY
BY
ATTORNEY

June 13, 1950     E. L. CODY     2,511,316
AUTOMOBILE SERVICING SYSTEM AND MEANS Filed Feb. 10, 1947     4 Sheets-Sheet 4

Inventor
EDWARD L. CODY

By Howard H. Sweet.
Attorney

Patented June 13, 1950

2,511,316

UNITED STATES PATENT OFFICE 2,511,316

AUTOMOBILE SERVICING SYSTEM
AND MEANS

Edward L. Cody, Denver, Colo.

Application February 10, 1947, Serial No. 727,513

7 Claims. (Cl. 104—44)

1

This invention relates to systems and constituent apparatus adapted to facilitate the performance of a series of successively-related steps or operations, and has as an object to provide an improved system particularly adapted for use in the field of automotive maintenance and repair.

A further object of the invention is to provide an improved system simulating a production line adapted for step-by-step accommodation of automotive vehicles undergoing maintenance or repair.

A further object of the invention is to provide an improved system characterized by a plurality of stations susceptible of cooperative alinement, independent altitudinal adjustment, and independent rotation into and out of alinement with adjacent units.

A further object of the invention is to provide an improved system including a plurality of independent, like stations susceptible of alinement to form a continuous track for the progressive translation of work units therealong and each independently adjustable, both angularly and altitudinally, for selective diversion of a work unit away from the otherwise continuous track.

A further object of the invention is to provide an improved system comprised from a plurality of independent, like, cooperative-alineable stations each selectively adjustable altitudinally and rotationally into and out of alinement with adjacent stations.

A further object of the invention is to provide an improved arrangement and combination of altitudinally and rotationally adjustable stations constituting an automotive maintenance and repair system adapted for efficient installation and use in shop and garage buildings of various sizes and shapes.

A further object of the invention is to provide improved means for adapting and interrelating a plurality of like, independent, altitudinally and rotationally adjustable stations for cooperation in and to constituting a progressive automotive maintenance and repair system.

A further object of the invention is to provide improved means for operatively associating an automotive vehicle with a maintenance and repair system comprised from a plurality of independent, like selectively-adjustable stations.

A further object of the invention is to provide an improved carriage translatable along and for the correlation of an automotive vehicle with a maintenance and repair system comprised from a plurality of independent, like, selectively-adjustable stations.

2

A further object of the invention is to provide improved means for facilitating the delivery of a carriage-mounted automotive vehicle from any selected one of a plurality of independent, like, rotationally and altitudinally adjustable stations constituting a maintenance and repair system.

A further object of the invention is to provide a system and apparatus susceptible of convenient, economical, and relatively simple development from largely conventional equipment and materials, that is employable to expedite and facilitate certain types of automotive maintenance or repair operations, that is readily adaptable to space and shape characteristics of existing locations, that closely simulates in operation accepted techniques of line production methods, and that is susceptible of modification and adaptation to fully and effectively meet a wide range of maintenance and repair problems common to the automotive field.

Figure 2:
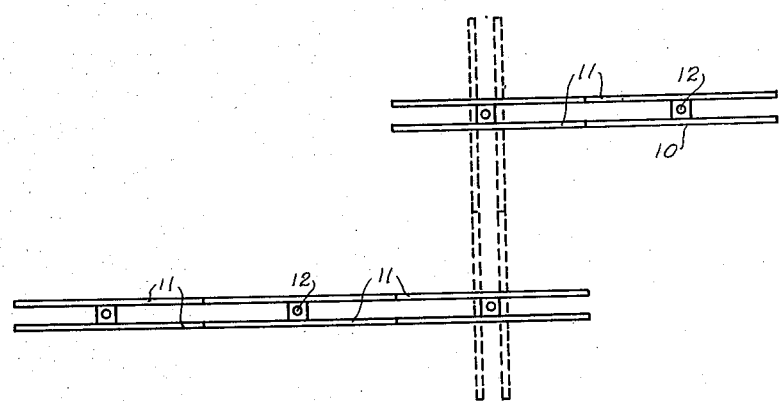
Figure 3:
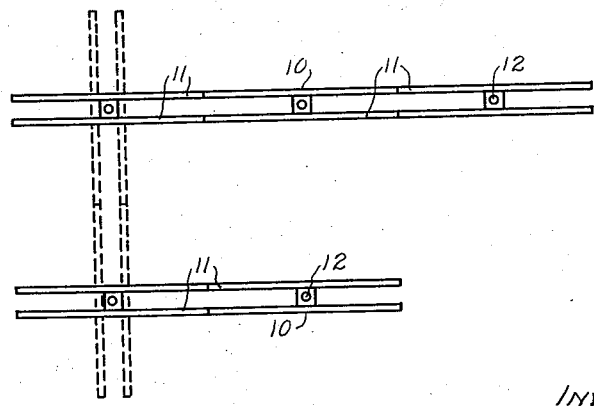
Figure 4:
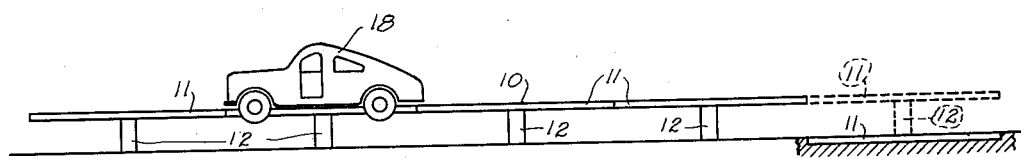
Figure 5:
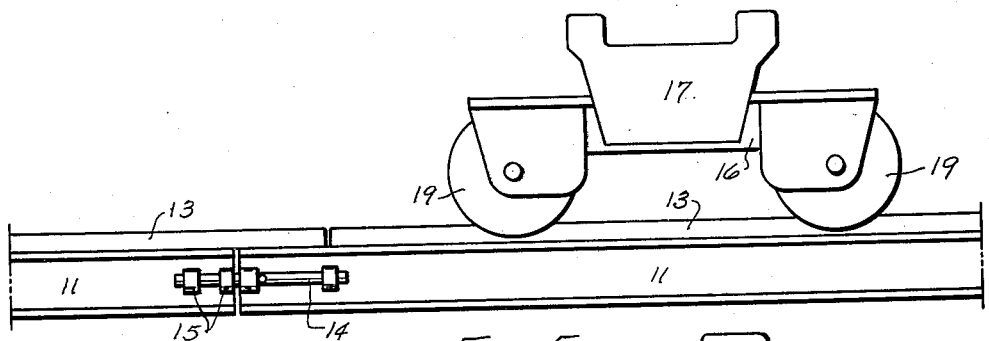
Figure 6:
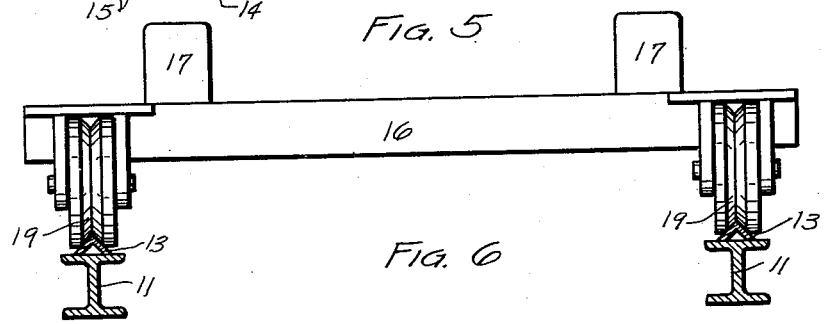
Figure 7:
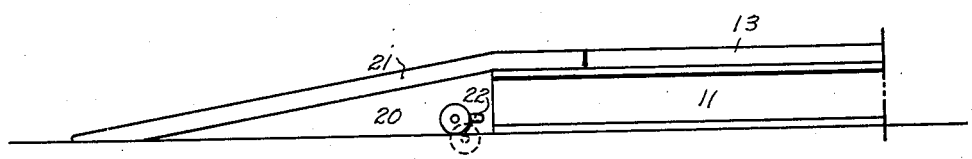
Figure 11:
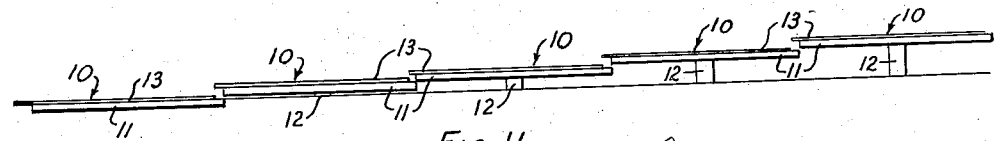
Figure 12:
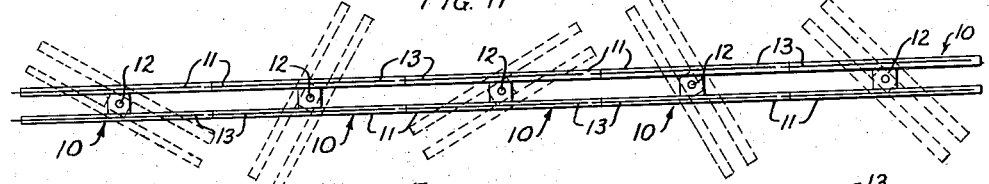
Figure 13:
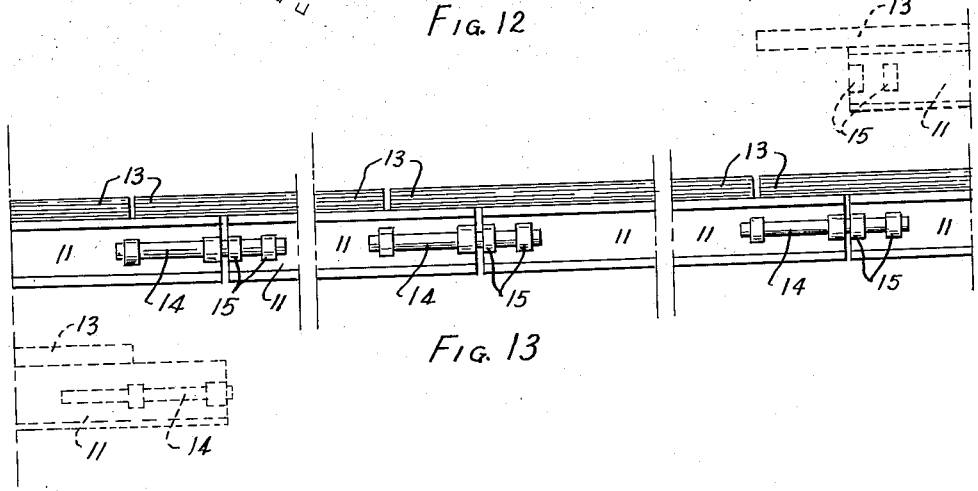
Figure 14:
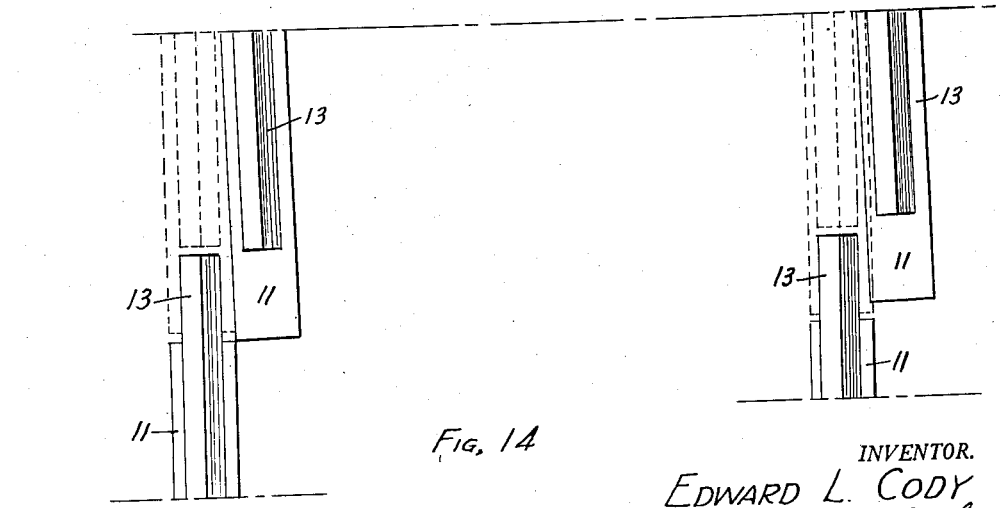
Figure 8:
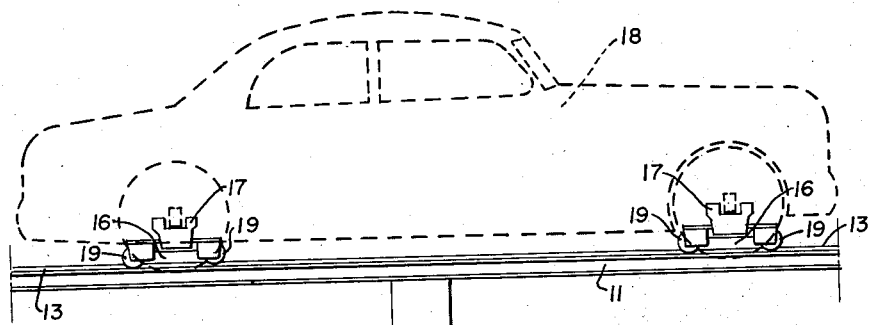
Figure 9:
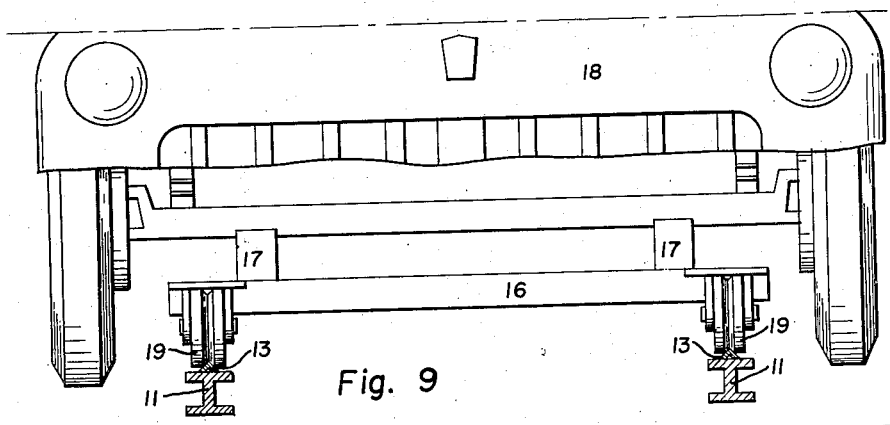
Figure 10:
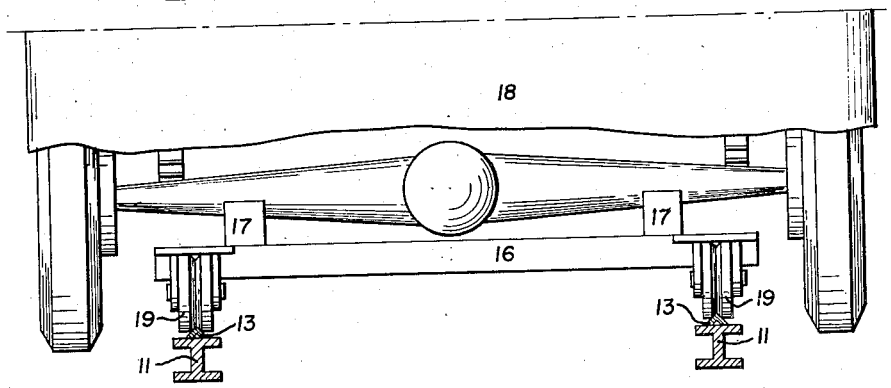

With the foregoing and other objects in view, my invention consists in the construction, arrangement, and combination of elements constituting a system and related apparatus as hereinafter set forth, pointed out in my claims, and illustrated by the accompanying drawings, in which:

Figure 1 is a diagrammatic plan view of a five-station system embodying the principles of my invention as arranged for continuous, straight-line operations. Figure 2 is a diagrammatic plan view of the five-station system shown in Figure 1 as non-linearly arranged for continuous, progressive operations. Figure 3 is a view of the system according to the previous figures as alternatively arranged for continuous, progressive operations in a restricted area. Figure 4 is a diagrammatic elevation of the system according to Figure 1 with a vehicle typically in place on one of the system stations and the initial system station altitudinally retracted to receive another vehicle. Figure 5 is a fragmentary, detail elevation, on an enlarged scale, illustrating abutting ends of adjacent stations in cooperating alinement and a typical carriage in end elevation on the track formed by said stations. Figure 6 is an end view of the showing of Figure 5, the station elements and associated tracks being in section. Figure 7 is a side elevation of a typical vehicle discharging facility in cooperating relation with one end of one of the system stations. Figure 8 is a fragmentary, detail elevation, on an enlarged scale, of a typical system station furnished with duplicate carriages operatively related therewith for the support and translation of a vehicle, the vehicle relative position being represented by broken lines. Figure 9 is a view similar to Figure 6 representing the front end of a vehicle as typically associated in axle-supported relation with a station-engaged carriage of the system during practical use of the latter. Figure 10 is a view similar to Figure 9 illustrating the rear end of a vehicle as typically associated with a station-engaged carriage of the system during practical use of the latter. Figure 11 is a diagrammatic elevation similar to Figure 4 representing the several system stations in longitudinal alignment of their rail elements and in progressively altitudinally offset relation facilitative of independent station rotation. Figure 12 is a plan view of the showing of Figure 11, broken line representations indicating certain of various positions to which the stations may be independently rotated. Figure 13 is an elevation similar to Figure 5 amplifying the joint and lock showing of the latter through a representation of the cooperating ends of four separate station rails as interlatched in a continuous track, rail lengths intermediate the joints being broken away to conserve space and broken line showings indicating altitudinally alternative positions to which end stations of the illustrated assembly are selectively shiftable upon release of the appropriate rail latches. Figure 14 is a fragmentary, detail plan of adjacent system station cooperating rail ends as relatively angularly displaced in a common horizontal plane to permit independent altitudinal shift of the stations, broken lines indicating the track-aligned positions from which the rail ends of one of the stations have been moved.

The manufacture, repair, and maintenance of certain unit assemblies, such as automobiles, are quite frequently characterized by a succession of progressively-related, specifically-distinct phases or operative steps requiring the application of special skills through the agency of particular tools and facilities. In such situations, experience has taught that economy of time and enhanced efficiency of result derive from an arrangement whereby the unit being operated upon is caused to pass, bodily, through a succession of work stations progressively associated in accordance with the work sequence to be accomplished and each suitably manned and equipped for efficient effectuation of a particular work operation, and it is to the provision of an improved such an arrangement and system, inexpensively and practically adaptable to effective use in a wide variety of specific locations for the consummation of various particular operations, that the instant invention is directed. In the repair and maintenance of unit assemblies, especially, it is noted that the operative requirements necessary to condition or rehabilitate the same feature or characteristic of the unit will vary widely as to particular units, some of which will need to pass through the full operative cycle of a succession of stations set up to accomplish a major sub-assembly overhaul, while others of the units need pass through but a few of such stations to receive all of the conditioning that they require, hence an important and significant feature of the invention is the provision of an arrangement and system characterized by facility of unit assembly diversion away from and out of the system at any and every one of the system stations.

Obviating the need for special construction of constituent facilities, the like stations of the improved system are, in each instance, represented by and centered in a conventional, operatively-installed vehicle lift 10 arranged for independent, selective, altitudinal and rotational adjustment in a manner common to such installations. The lifts 10 comprised in any given system may be of any desired and suitable specific size, construction, and particular method of individual actuation, either hydraulic, pneumatic, electrical, or mechanical, and are hence typically represented in the drawings as each consisting of a pair of spaced, parallel rails 11, of suitable length, horizontally disposed in fixed, supported relation on the upper end of a vertically-disposed, axially-reciprocable cylinder 12 engaged within a sunken well, as is common practice. To condition the system comprised from the lifts 10 for maximum utility and flexibility in the maintenance and repair of automobiles, the said lifts are preferably of that conventional type wherein the rails 11 of each unit are spaced apart a distance less than the lateral spacing between the wheels of standard automobiles, thereby permitting such a vehicle to be rolled upon its own wheels over and into position above the rails of a lift unit with the vehicle axles disposed for engagement by said rails as the lift is elevated, and each lift unit is installed for full-circle rotation of its cylinder 12 within and relative to its accommodating well, for axial displacement of said cylinder relative to its well between a lower limit determined by engagement of the associated rails 11 with the ground or floor surface and an upper limit determined by the operatively-effective length of the cylinder, and for independent, selective actuation through the agency of conventional controls positioned either adjacent or remote from the lift, all of which is well-known practice as evidenced by a multitude of lifts currently in use.

Whatever may be the particular lift construction, installation, and method of lift actuation and control employed, a feature of the improved system is the grouping of a succession of like lift installations, in a number corresponding with that of the work phases or steps desired to be accomplished, so that the rails 11 of adjacent lifts may be brought into end-abutting alinement to form a two-lift track section on and along which the unit assembly being operated upon may be translated from one and to the other of said lifts. Dependent upon the number of lift stations comprised in a given system, the pattern of the lift grouping may be widely varied to adapt the system installation to size and shape limitations of the selected site; Figures 1, 2 and 3 typifying group pattern variations of a five-station system. In Figure 1, the five lifts 10 constituting the stations of the system are installed with their cylinder 12 axes intersecting a straight line and spaced apart along said line uniform distances corresponding with their rail 11 lengths so as to permit end-abutting alinement of all of the rails 11, when desired, to define a straight track extending from end to end of the system. In the arrangement according to Figure 1, each lift 10 is capable of full-circle rotation about the axis of its cylinder 12 and independent altitudinal adjustment, so that any one of said lifts may be independently raised or lowered relative to the adjacent lifts and out of rail-end interference therewith, rotated about its cylinder axis to any angular displacement of its rails away from the track alignment, and lowered to ground or floor engagement for discharge of its load away from the system. A shorter, laterally-offset, five station group pattern is shown in Figure 2, in which arrangement the first two lifts are installed for end-abutting of the lift system. Typical of dollies suitable for use in and with the improved system, the construction shown in Figures 5 and 6 has been found to be eminently practical. A rigid frame 16, of cast or fabricated metal, is formed with spaced, parallel, transverse struts 17 upstanding to dispose their shallowly-recessed, upper ends in position to receive and support transverse axle or frame members of a unit assembly, such as an automobile 18, and the opposite ends of said frame 16 rotatably mount paired, circumferentially V-grooved wheels 19 arranged in tandem and for rolling engagement with an angle length 13, the pairs of wheels 19 being spaced apart on the frame 16 so as to simultaneously engage with the angle length 13 tracks of a lift 10 and mount the frame in transversely bridging relation above and between the rails 11 thereof. With a track-engaged dolly supporting each end of a unit assembly on a lift 10 elevated to raise the unit assembly wheels out of contact with the ground or floor, the unit assembly is mounted for rotation and altitudinal displacement with its lift mounting, for convenient shifting longitudinally of the lift, and for translation from the first and to a second alined lift for station-to-station travel across all of the lifts in the system, even when some or all of the unit assembly wheels have been dismounted.

The overall height of a track-mounted dolly and supporting rail 11 may exceed the clearance between axle and ground of a unit assembly to be worked over the system, thereby complicating initial association of the unit assembly with the system, but such complication is readily obviated by pit-installation of the first lift 10, as indicated in Figure 4, to permit retraction of the lift rails 11 below the ground or floor surface to such depth as will permit the lift-mounted dollies to roll freely below the unit assembly axles; elevation of the lift with the dollies suitably positioned thereon serving to engage the said dollies with the unit assembly axles or frame members in the desired assembly-supporting relationship. Release of the unit assembly from the dollies and rails for rolling support on its own wheels is facilitated by the use of a transportable inclined ramp unit designed for abutting end registration with the rails 11 and equipped with angle track elements adapted to function as inclined extensions of the rail tracks 13, such a ramp being illustrated in Figure 7 in cooperating relation with a ground-engaged rail 11 of any one of the lift units 10. As shown, the unloading ramp consists of a rigid frame 20 having an upper surface inclined from a height corresponding with rail 11 depth to engagement with the ground at a small angle, track elements 21 fixed to the frame inclined upper surface for end registration with and to serve as extensions of the rail angle lengths 13, and a wheel-equipped, eccentrically-related axle 22 selectively adjustable relative to the frame 20 to either ground-base said frame or to wheel-support the frame for convenient shifting of the ramp into and out of cooperation with the rails of the various lifts. With the ramp in place at the end of a pair of lift rails 11 and the tracks 21 end-registered with the rail angle lengths 13, the dolly-supported unit assembly may be moved along the elements 13 and tracks 21 until the consequent lowering of the assembly brings the assembly wheels into ground and floor engagement and the dollies are freed from their supporting relation therewith.

The improved system is of notable advantage in the repair and servicing of automobile wheel brakes, although by no means limited to such use. One or more, conveniently the first, of the lift stations may be associated with a drainable pit, fluid flow lines, and pertinent disassembly tools and facilities, whereby the unit assembly may be stripped, cleaned, and prepared for subsequent operations to which it is readily shifted along the elevated lift track. As soon as the first lift station has been cleared of its load, the said lift may be depressed, equipped with a set of dollies, and promptly recharged with another unit assembly, and in this manner the entire system may be kept charged with unit assemblies undergoing progressive, station-by-station repair or servicing. The successive stations of the system are supplied with the tools, facilities and skills pertinent to the operations there to be accomplished, which operations can readily be so correlated as to maintain an even progress of unit assemblies through and along the system, with convenient provision for diversion of any one of said assemblies out of the system at any station thereof, and to the end that the full cycle of contemplated operations is accomplished on each such assembly when the latter clears the last station of the system.

Since many changes, variations, and modifications in the specific form, construction, and arrangement of the elements shown and described may be had without departing from the spirit of my invention, I wish to be understood as being limited solely by the scope of the appended claims, rather than by any details of the illustrative showing and foregoing description.

I claim as my invention:

1. A system of the character described comprising a plurality of like, independently rotatable and altitudinally adjustable work-supporting stations successively alineable at any elevation within their altitudinal travel range as sections of a continuous track.

2. A system of the character described comprising a plurality of like, independently rotatable and altitudinally adjustable work-supporting stations successively alineable at any elevation within the station altitudinal travel range as sections of a continuous track, and means for interlocking adjacent stations in end-registered, coplanar alinement.

3. A system of the character described comprising a plurality of like, independently rotatable and altitudinally adjustable work-supporting stations successively alineable at any elevation within the station altitudinal travel range as sections of a continuous track, and means for supporting a unit assembly on and for translation across and from one and to another of said stations.

4. A system of the character described comprising a plurality of like, independently rotatable and altitudinally adjustable work-supporting stations successively alineable at any elevation within the station altitudinal travel range as sections of a continuous track, means for interlocking adjacent stations in end-registered, coplanar alinement, and means for supporting a unit assembly on and for translation across and from one and to another of said stations.

5. In a system of the character described having a plurality of like, independently rotatable and altitudinally adjustable work-supporting stations, parallel-rail platforms topping said stations successively alineable at any elevation within the station altitudinal travel range in end-abutting alinement, the second and third lifts are rotatable (broken line showing) into end-abutting alinement perpendicular to the alined position of the first two stations, and the third, fourth and fifth lifts are arranged for end-abutting alinement parallel to and offset from said alined position of the first two stations. Obviously, the group pattern of Figure 2 permits translation of a unit assembly progressively along the rails 11 from one and to the next succeeding of the lift stations until all five of said stations have been traversed, and at the same time provides for selective diversion of the unit assembly away from the system at any one of the lift stations, in the manner set forth with reference to the pattern of Figure 1. Figure 3 shows a five-station group pattern possessed of all the operative attributes of the preceding two views, more compact than either thereof, and arranged to deliver the unit assembly from the last system station in a direction opposite to the receiving travel thereof and in laterally-offset parallelism therewith. Other groupings of and patterns for the multi-station system are readily apparent, the flexibility and adaptability of the system being restricted by but the one requirement that adjacent lifts be susceptible of end-abutting rail alinement.

Translation of the unit assembly along the stations of the system is facilitated by the use of wheeled dollies, hereinafter more specifically described, for which purpose it is expedient to form or modify the rail 11 upper surfaces for engagement with the dolly wheels, and such modification is conveniently had, in the case of conventional lifts having I-beam, flat-topped rails, through the use of straight angle lengths 13 on and in alinement along each rail 11 top surface with the angle free side margins engaging and secured to the rail surface so as to dispose the angular junction of said margins as an apex directed upwardly away from the associated rail. When the angle lengths 13 are employed as shown and described, it is desirable that the joints between adjacent angle length ends of adjacent lifts 10 be staggered out of registration with the joints between the corresponding lift rail ends, and this is readily accomplished, with enhanced joint rigidity and security, by projecting the angles 13 beyond the corresponding rail ends at one end of each lift, and foreshortening said angles to terminate a corresponding distance inwardly from the rail ends at the other end of the lift, so that when adjacent lifts are end-abutted and alined in the proper relationship, the projections of the lengths 13 on one lift will overlie the exposed rail top surface at the end of the other lift and register with the foreshortened length 13 ends of the latter, as is clearly shown in Figure 5.

Provision of the track-forming angle lengths 13 in the mounting on and end-staggered relation with the station rails 11 as shown and described in no way nullifies or impairs the independent revolubility or altitudinal adjustability of the several so-equipped stations. With the stations 10 installed for continuous track alignment of their rails 11 and without the angle lengths 13, or with such angle lengths mounted to end register with the associated rails, it is manifest that the separate stations may be individually and selectively adjusted to position their respective rail planes at different altitudinal levels, in which relationship the separate stations may be relatively rotated without interference of their rail ends. However, in view of the size, normal proportions, and installation characteristics of conventional lifts, it is customarily inexpedient to so relate a succession of such lifts for rail alignment as to eliminate a nominal clearance between the adjacent aligned rail ends, and when such clearance amounts to five-tenths to six-tenths of an inch, a customary installation tolerance, the abutting adjacent rail ends will clear to accommodate relative rotation of their respective stations when the station rails are coplanar, such clearance and relative station rotation being typified by Figure 14. Given the customary rail end clearance above noted, adjacent rail ends may be angularly and relatively displaced out of alignment when in the same altitudinal plane and equipped with the end staggered angle lengths 13 in the arrangement shown and described, thereby conditioning the respective stations for independent altitudinal adjustment free from rail end, or angle length end, interference. When, however, adequate adjacent rail end clearance is lacking in an organization furnished with the end staggered angle lengths 13, it is still feasible to effect independent rotation and altitudinal adjustment of any given station relative to the others, since the adjacent stations in any group are susceptible of relative altitudinal adjustment, through elevation of the station carrying the relatively overlapping angle length 13 and extensions and lowering of the station carrying the extension-underlying rail ends, to dispose the rails of adjacent stations in altitudinally staggered planes, as represented in Figure 11, in which relationship the rails of any station may be rotated out of track alignment without adjacent station rail interference and into any of the broken line positions of Figure 12, wherein the given station is free for any desired further independent rotation or altitudinal adjustment.

End-abutting alinement of the rail 11 ends of adjacent lifts 10, once established, is maintained and secured against derangement such as would interrupt the continuity of the end-registered angle lengths 13 by means of complementary facilities on the adjoined rail ends selectively interengageable to latch and hold said rail ends in the desired alinement, a simple arrangement effective for such purpose, typical of other functionally-equivalent constructions, being illustrated in Figure 5 as a slide-bolt 14 reciprocably carried in guides on the web and at one end of a rail 11 for selective manipulation into and out of engagement with keepers 15 suitably fixed to and projecting from the web of the end-adjacent, alined rail 11; a cooperable bolt and keeper assembly, or equivalent latching arrangement, at the meeting rail ends of all lifts comprised within a given system being a contemplation of the invention.

The lift 10 preferred construction being such as will engage the lift rails 11 between the wheels of unit assemblies to be worked upon and with transverse axle or frame members of such assemblies, and certain of the operations to be facilitated through use of the improved system having to do with unit assembly members, such as brakes, susceptible of access only when the assembly wheels are dismounted, a significant feature of the invention is the provision of wheeled dollies, two such for each unit assembly traversing the system, constructed and arranged to engage with and roll along the tracks defined by the angle lengths 13 in such supporting relation with a unit assembly as will permit of translation of the latter along and throughout the entire length registration, and complementary means on adjacent platform rail ends selectively interengageable to lock the platforms of adjacent stations in coplanar, registered relationship.

6. In a system of the character described having a plurality of like, independently rotatable and altitudinally adjustable work-supporting stations and platforms topping said stations, wheel-engageable track elements fixedly superposed in spaced parallelism on said platforms to project at their corresponding ends beyond one end of the platform and to correspondingly fall short at their other ends of attaining the adjacent platform end, and complementary means on the proximate ends of adjacent platforms selectively interengageable to lock adjacent station platforms in coplanar, platform-overlapping, end-registered alinement of the track elements thereof at any elevation within the station altitudinal travel range.

7. In a system of the character described having a plurality of like, independently rotatable and altitudinally adjustable work-supporting stations, platforms topping said stations, and track elements fixedly superposed in spaced parallelism on said platforms for end-registered alinement with the corresponding elements of adjacent platforms at any elevation within the station altitudinal travel range, wheeled dollies for guided engagement with and translation along said track elements, each of said dollies comprising a rigid frame disposable in transversely-bridging relation with and above the parallel track elements, load-receivable struts upstanding from and in spaced, parallel relation on said frame, tandem-paired wheels in supporting relation with each end of said frame and in a spaced parallelism of the pairs corresponding with the track element spacing, and peripheral grooves on said wheels rollably engageable with said track elements.

EDWARD L. CODY.

REFERENCES CITED

The following references are of record in the file of this patent:

UNITED STATES PATENTS

| Number | Name | Date |
|---|---|---|
| 666,058 | Kienholz | Jan. 15, 1901 |
| 1,404,926 | Burnham | Jan. 31, 1922 |
| 1,805,910 | Hawkins | May 19, 1931 |
| 1,825,683 | Stedefeld et al. | Oct. 6, 1931 |
| 2,036,535 | Nelson | Apr. 7, 1936 |
| 2,052,118 | Tear | Aug. 25, 1936 |